United States Patent [19]

Butts

[11] Patent Number: 5,413,128

[45] Date of Patent: May 9, 1995

[54] AUTOMATIC PERSONAL CAR WASHING METHOD AND APPARATUS

[76] Inventor: James N. Butts, 2819 Marks St., Orlando, Fla. 32803

[21] Appl. No.: 223,771

[22] Filed: Apr. 6, 1994

[51] Int. Cl.⁶ .............................................. B08B 3/02
[52] U.S. Cl. .................... 134/56 R; 134/45; 134/123; 134/181; 134/111
[58] Field of Search ............... 134/57 R, 56 R, 123, 134/45, 172, 181, 95.3, 111; 15/DIG. 3

[56] References Cited

U.S. PATENT DOCUMENTS

| | | | |
|---|---|---|---|
| 4,848,384 | 7/1989 | Christopher et al. | 134/57 R |
| 4,893,229 | 1/1990 | Detrick | 134/123 |
| 4,977,912 | 12/1990 | Oota et al. | 134/104.4 |
| 5,040,485 | 8/1991 | Bailey et al. | 134/57 R |
| 5,098,023 | 3/1992 | Burke | 134/123 |
| 5,255,695 | 10/1993 | Downey | 134/123 |
| 5,329,949 | 7/1994 | Moncourtois et al. | 134/57 R |

*Primary Examiner*—Frankie L. Stinson
*Attorney, Agent, or Firm*—James H. Beusse

[57] ABSTRACT

A personal automatic car wash is provided which includes an enclosure for the car. A movable fluid dispensing assembly is mounted on a track in the enclosure so that fluids can be dispensed to the surfaces of a stationary car situated within the enclosure. The fluid dispensing assembly is driven by a drive motor longitudinally back and forth about the car while fluids are dispensed to the car. Under computer control, the fluid dispensing assembly sequentially sprays a heated soap/water mixture under relatively low pressure and then a heated rinse water under relatively high pressure to clean the car. A steam-bath like atmosphere is thus provided which enhances the removal of dirt from the car and the cleaning of the car without the use of abrasive cleansers. A spot free water rinse is applied to the car to further clean the car.

13 Claims, 3 Drawing Sheets

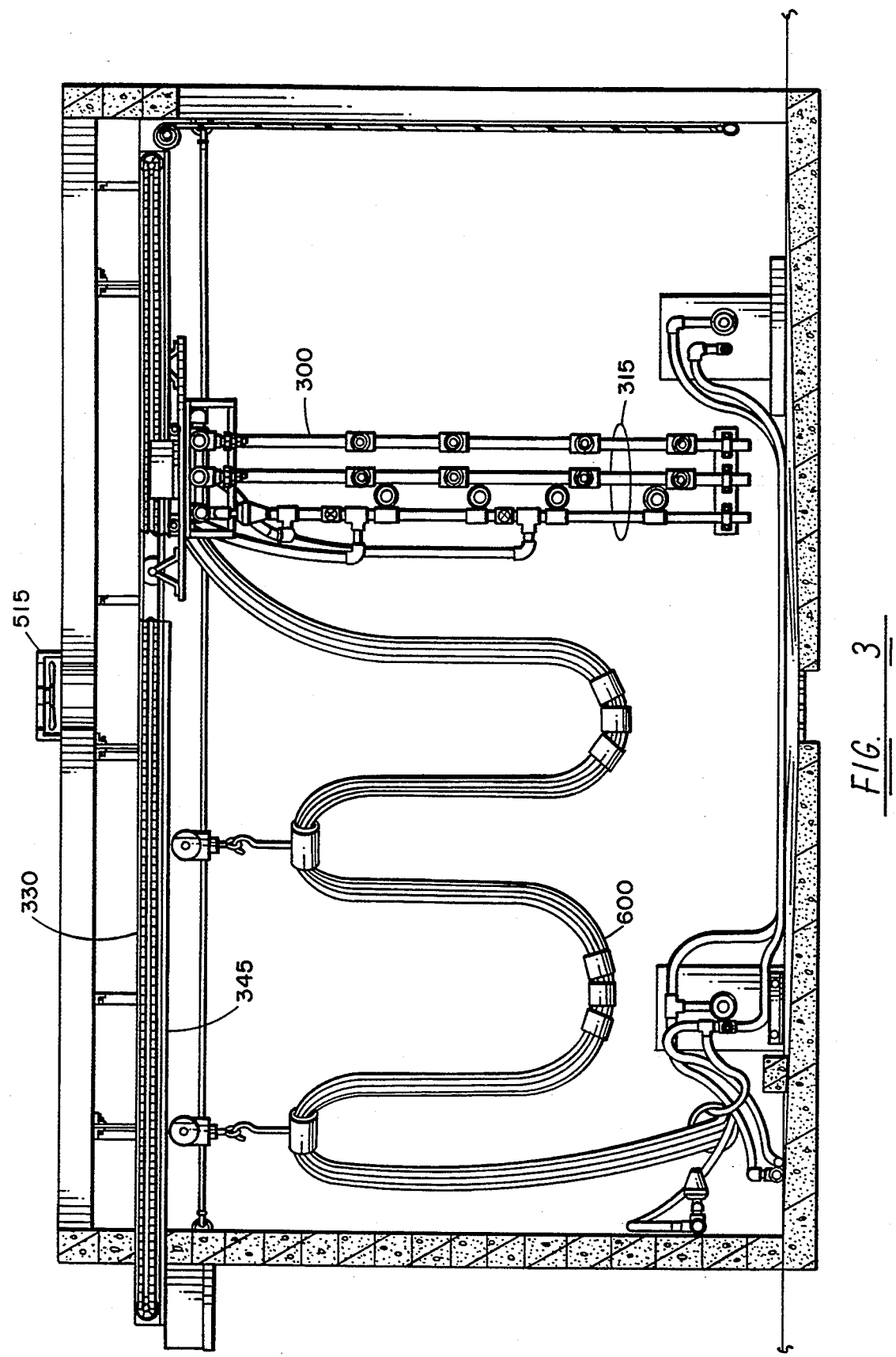

AUTOMATIC PERSONAL CAR WASHING METHOD AND APPARATUS

BACKGROUND OF THE INVENTION

This invention relates in general to car washes for cleaning cars and, more particularly, to automated car washes in which the user need not be actively involved in the process of cleaning the car.

The tried and true approach for washing the family car and other transportation vehicles is with sponge, detergent and towel. This approach of course consumes a large amount of the car owner's time. Equally unfortunately, when the sponge starts to collect dirt from the vehicle, the sponge becomes abrasive and the rubbing action of the sponge over the car finish can actually damage the finish that it is supposed to be cleaning. Likewise, the foam brushes found at "do-it- yourself" car washes can also damage a car's finish by abrasive action.

Drive through car washes have been known for several years. In these car washes, the car owner is relieved of the burden of washing the car himself. In one form, the car is attached to a conveyor device and pulled through a multi-stage process including sequential washing, brushing, drying and buffing stations. In another form, the car is stationary during the washing process and a series of rotating brushes is mechanically driven about the car. Unfortunately, while such car washes clean the car very quickly, once again the abrasive action involved in some of the stations which are not closely supervised can significantly damage the car's finish.

SUMMARY OF THE INVENTION

Accordingly, one object of the present invention is to provide a car wash which is fully automatic.

Another object of the present invention is to provide a car wash which is suitable for use at home.

Yet another object of the present invention is to provide a car wash which is capable of washing the user's car without the use of abrasive cleansers and abrasive instruments which can damage a car's surface.

In accordance with one embodiment of the present invention, a car wash is provided which includes an enclosure for receiving a car which is to be washed, the enclosure including an opening through which the car can enter and exit. The car wash includes an input for untreated water and a water softener, coupled to the input, for providing soft water. The car wash also includes a hot water heater, coupled to the water softener, for providing hot soft water. The car wash further includes a pressurized soap source, coupled to the hot water heater, for mixing the hot soft water with soap to provide a low pressure heated soap/water mix. The car wash still further includes a pressurized rinse water source, coupled to the hot water heater, for pressurizing the hot water to provide high pressure heated rinse water. A spot free water generator is coupled to the water softener to provide spot free water. The car wash also includes a movable fluid application apparatus which is situated in the enclosure. The movable fluid application apparatus includes an arch-shaped support assembly having first nozzles for applying the low pressure heated soap/water mix to the car, second nozzles for applying the high pressure heated rinse water to the car, and third nozzles for applying the spot free water and temperature normalization or stabilization using city water to the car, thus providing a steambath-like atmosphere for cleaning the car. A drive motor is coupled to the movable fluid application apparatus for driving the fluid application apparatus back and forth in the enclosure to distribute fluid to the car to clean the car.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 3 is a cross-sectional view of the car wash of FIG. 1A taken along section line 3—3.

DETAILED DESCRIPTION OF THE INVENTION

Figure 1A:
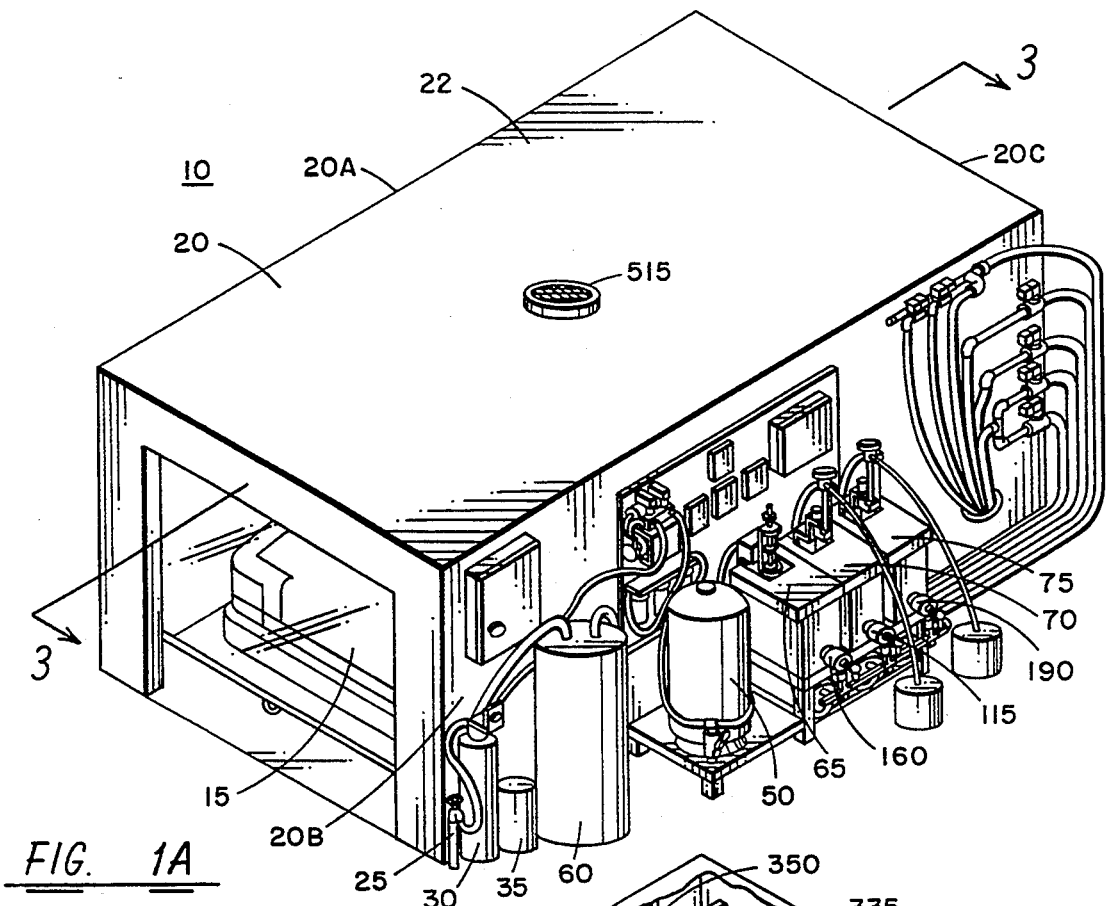
FIG. 1A is a perspective view of a car wash in accordance with the present invention.
Figure 1B:
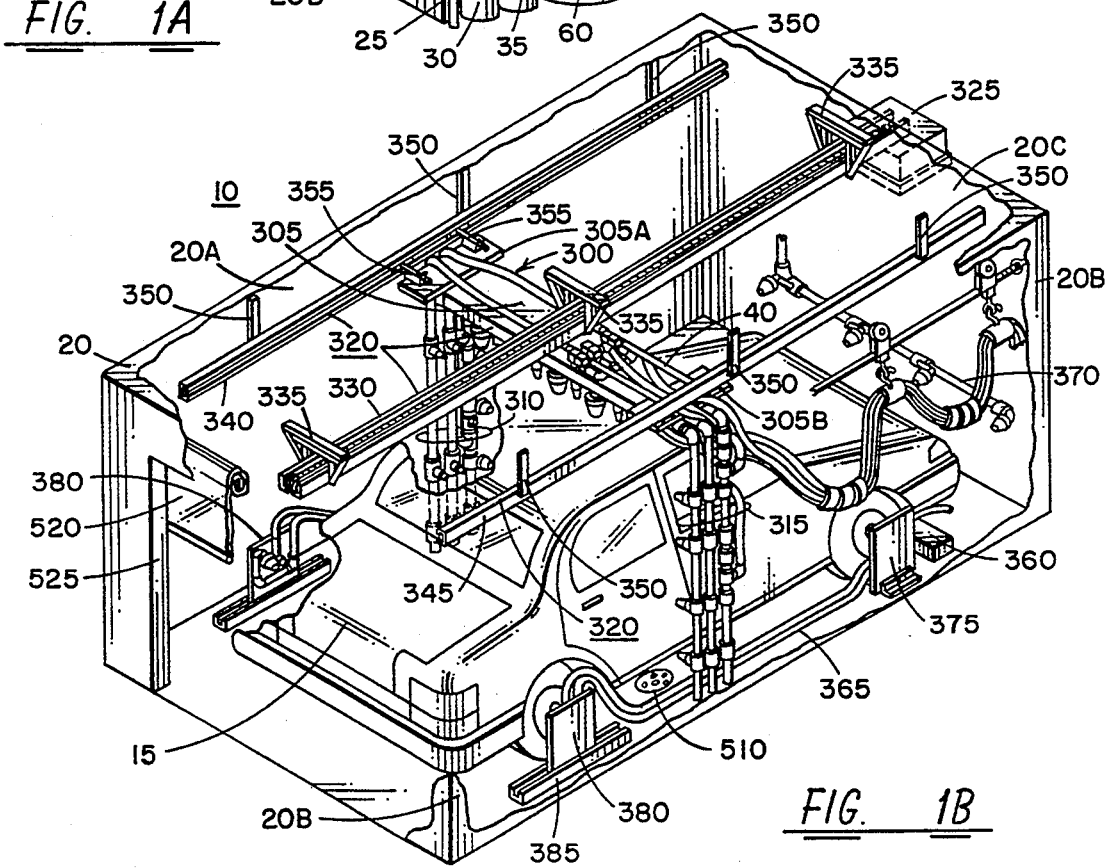
FIG. 1B is a perspective view of the car wash of FIG. 1A shown with a portion cut away to reveal interior features.

FIG. 1A is a perspective view of a car wash 10 which shows the exterior of the car wash. FIG. 1B is a perspective view of car wash 10 including a cutaway portion which shows the interior of the car wash. To use car wash 10, the user drives car 15 into a booth 20 or other suitable enclosure. Booth 15 may be conveniently located within a home's attached garage or an outbuilding. As opposed to conventional automated car washes which typically apply unheated soap and rinse water to the car during a cleaning cycle which lasts just 2–5 minutes, the disclosed car wash provides an overnight (or at least one hour) high temperature cleaning and rinsing process which subjects the car to a relatively high temperature steambath-like environment followed by a spot-free drying cycle.

Figure 2:
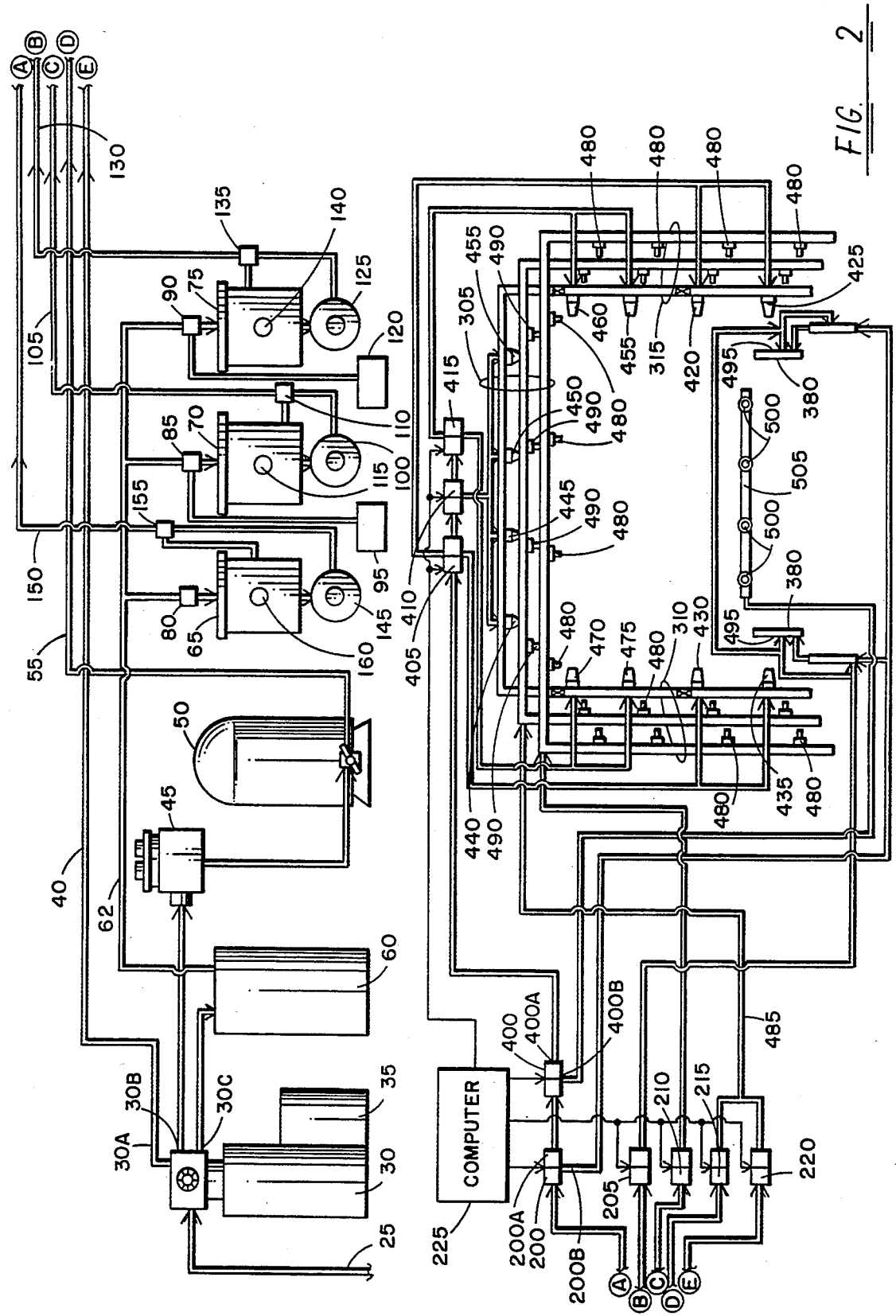
FIG. 2 is a block diagram of the car wash of FIG. 1A.

FIG. 2 is a schematic diagram of car wash 10. In the following discussion, FIG. 2 and FIG.'s 1A–1B will be described at the same time. Input water is provided by a water main 25 to a water softener 30. Water softener 30 includes a salt tank 35. Water softener 30 converts hard input water into soft water at its three outputs 30A, 30B and 30C. Soft water output 30A is coupled to soft water supply line 40.

Soft water output 30B is coupled to the input of a spot free water generator 45. Spot free water generator 45 removes impurities from the water supply that would otherwise cause the formation of spots on the car's finish when the car is dried. One spot free water generator which can be employed as spot free water generator 45 is a reverse osmosis treatment system which removes mineral salts and most organic chemicals from water. Whereas a conventional filter merely traps impurities, the reverse osmosis membrane included in the spot free water generator provides a self cleaning capability. Spot free water generator 45 may include a conventional prefilter before the reverse osmosis membrane. The Syncro spot free rinse system manufactured by Pro Spot Free Rinse Systems, Irvine, Calif. is an example of one spot free water generator which may be employed as spot free water generator 45. The output of spot free water generator 45 is coupled to a storage tank 50 which provides spot free water to spot free water supply line 55.

Soft water output 30C is coupled to a hot water heater 60 which heats soft water to a temperature of approximately 120 degrees F. The output of hot water heater 60 is coupled via hot water supply line 62 to a high pressure hot water holding tank 65, a body soap holding tank 70 and to a tire soap holding tank 75. The hot water inputs of hot water holding tank 65, body soap holding tank 70 and tire soap holding tank 75 are provided with respective input valves 80, 85 and 90. One suitable input valve which may be employed as input valves 80, 85 and 90 is a Hydraminder valve manufactured by Hydro System Company, Cincinnati, Ohio 45244. This valve is a combination anti-siphon valve, water level control and mixing valve.

A body soap supply 95 is coupled to one input of valve 85. Hot water supply line 62 is coupled to another input of valve 85. Valve 85 mixes input hot water with soap and provides the resultant soap mixture to body soap holding tank 70. A centrifugal pump 100 is coupled to the output of body soap holding tank 70 to pump the soap mixture into body soap supply line 105. Pump 100 maintains a relatively low pressure of approximately 45 psi. A pressure relief valve 110 is coupled from body soap holding tank 70 to the body soap supply line 105. Relief valve 110 provides circulation through pump 100 to prevent pump 100 from overheating when pump 100 is run continuously. However, if pump 110 is cycled on and off, bypass valve 110 can be omitted. As seen in FIG. 1A, a thermostatically controlled heating element or heater 115 is mounted in body soap tank 70 to heat the soap mixture to a temperature within the range of approximately 120 degrees F. to approximately 140 degrees F.

Returning to FIG. 2, a tire soap supply 120 is coupled to one input of valve 90. Hot water supply line 62 is coupled to another input of valve 90. Valve 90 mixes input hot water with tire soap and provides the resultant soap mixture to tire soap holding tank 75. A centrifugal pump 125 is coupled to the output of body soap holding tank 75 to pump the tire soap mixture into tire soap supply line 130. Pump 125 maintains a relatively low pressure within the range of approximately 30 psi to approximately 50 psi. A pressure relief valve 135 is coupled from tire soap holding tank 75 to the tire soap supply line 130. Relief valve 135 provides circulation through pump 125 to prevent pump 125 from overheating when pump 125 is run continuously. However, if pump 125 is cycled on and off, bypass valve 125 can be omitted. As shown in FIG. 1A, a thermostatically controlled heating element or heater 140 is mounted in tire soap tank 75 to heat the tire soap mixture to a temperature of within the range of approximately 100 degrees F. to approximately 120-130 degrees F.

As seen in FIG. 2, valve 80 couples hot water supply line 62 to the input of high pressure hot water tank 65. A high pressure positive displacement pump 145 pumps hot water from tank 65 under high pressure to high pressure cleaner and rinse supply line 150. Pump 145 maintains a relatively high pressure within the range of approximately 800 psi to approximately 1000 psi. A pressure relief valve 155 is coupled to high pressure supply line 150 and high pressure hot water tank 65 as shown to relieve pressure in supply line 155. When pressure in supply line 150 exceeds a predetermined value such as 1000 psi, for example, a portion of the high pressure water supply output is shunted back to tank 65 by valve 155 to relief pressure in supply line 150. As illustrated in FIG. 1A, a thermostatically controlled heating element or heater 160 is mounted in high pressure hot water tank 65 to heat the water therein to a temperature within the range of approximately 100 to approximately 120–140 degrees F. before the water is provided to high pressure cleaner and rinse supply line 150.

High pressure supply line 150, tire soap supply line 130, body soap supply line 105, spot free water supply line 55 and soft water supply line 40 are respectively coupled to valves 200, 205, 210, 215 and 220, the opening and closure of which are controlled by an electronic processor or computer 225. One computer which is suitable for usage as computer 225 is a Dial Series Controller, an irrigation controller manufactured by Irritrol. Computer 225 is coupled to valves 200, 205, 210, 215 and 220 to control the timing of the delivery of cleaning fluids and rinses to car 15 within car wash 10.

Many of the cleaning fluids and rinses employed by car wash 10 are delivered to car 15 by a movable fluid delivery assembly 300. In one embodiment of the invention, fluid delivery assembly 300 is substantially U-shaped or arch-shaped. As seen in FIG. 1B, fluid delivery assembly 300 includes a horizontal support member 305 having opposed ends 305A and 305B. Vertically oriented fluid delivery portions 310 and 315 extend from ends 305A and 305B, respectively. A conventional garage door opener drive assembly 320 is employed to move fluid delivery assembly 300 back and forth over car 15 to dispense cleaning fluids and rinsing fluids to the car. Drive assembly 320 includes a garage door opener motor 325 which engages and drives a chain in track 330. In one form, track 330 is mounted to the ceiling 22 of enclosure 20 by supports 335. Alternately, the entire car wash structure may be made free-standing and separate from the building structure. The free-standing structure employs posts (not shown) at each corner with cross-members extending longitudinally from the posts. The track 330 mounts to the cross-members. U-shaped channels 340 and 345 are shown mounted by supports 350 to ceiling 22 of enclosure 20 adjacent to, and parallel with, side walls 20A and 20B, although it will be appreciated that in a free-standing structure the channels 340, 345 would be attached to the corner posts. The open sides of U-shaped channels 340 and 345 face inward toward each other to receiver rollers 355 which are mounted at support ends 305A and 305B. In this manner which resembles the conventional support arrangement for a garage door, fluid delivery assembly 300 is movably supported within enclosure 20. Fluid delivery assembly 300 is driven back and forth along the length of track 330 by motor 325 to deliver selected fluids to car 15 at times controlled by computer 225.

A tire bumper 360 is mounted on floor 365 to engage a front tire of car 15 to align car 15 within enclosure 20. A grill cleaning assembly 370 is mounted on garage back wall 20C to deliver cleaning and rinsing fluids to the grill or front of car 15. Referring again to FIG. 1B, front tire cleaning stations 375 and 375' (not shown) are situated on the floor 365 adjacent the front tires of car 15 and rear tire cleaning stations 380 and 380' are situated adjacent the rear tires of car 15. Tire cleaning stations dispense tire soap and rinse water to the tires of car 15.

Bumper 360 is located on floor 365 a sufficient distance from grill cleaning assembly 370 so that the front of car 15 is appropriately spaced from grill cleaning assembly 370. It has been found that a distance within the range of approximately 15 inches to approximately 30 inches between grill cleaning assembly 370 and the front of the car produces acceptable cleaning results. It should be noted that this distance will vary according to the particular design of grill cleaning assembly 370 and the pressure of the cleaning and rinsing fluids therein. Bumper 360 acts to calibrate the position of car 15 within enclosure 20 with respect to grill cleaning assembly 370 and tire cleaning stations 375 and 380.

Front tire cleaning stations 375 and 375' have fixed locations within enclosure 20. Rear cleaning stations 380 and 380' are situated in movable tracks 385. The first time that a particular car 15 is washed in car wash 10, a front tire of car 15 is driven into bumper 360 and rear tire cleaning stations 380 and 380' are adjusted within track 385 until stations 380 and 380' are positioned adjacent the rear tires. Rear tire cleaning stations 380 can be left in this same position for subsequent washes of the same car.

The coupling of the aforementioned fluid supply lines to fluid delivery assembly 300 is now discussed. High pressure water valve 200 includes two outputs 200A and 200B. Valve output 200A is coupled to the input of another high pressure water valve 400 which includes two outputs 400A and 400B. Valve output 400A is coupled to the input of valve 405 which includes outputs 405A, 405B and 405C. Valve 405 feeds valve high pressure valve 410 which feeds high pressure valve 415.

To dispense high pressure water to the rocker panels or lower regions of car 15, under the direction of computer 225 valve output 405A provides high pressure water to nozzles 420 and 425 which are located on the lower part of fluid delivery portion 315. At the same time and under the direction of computer 225, valve output 405C provides high pressure water to nozzles 430 and 435 which are located on the lower part of fluid delivery portion 310. Nozzles 420, 425, 430 and 435 are vertically positioned to spray fluid onto the rocker panel region or lower region of car 15.

To distribute high pressure water to the top of car 15, valve output 405B is coupled to the input of valve 410. More particularly, valve output 410B is coupled to nozzles 440, 445, 450 and 455 which are located on horizontal support member 305.

To distribute high pressure water to the windows of car 15, valve output 410A is coupled to the input of valve 415. Valve output 415A is coupled to nozzles 460 and 465 which are situated on the upper part of fluid delivery portion 315. Valve output 415B is coupled to nozzles 470 and 475 which are located on the upper part of fluid delivery portion 310. Nozzles 460, 465, 470 and 475 are vertically positioned to spray fluid onto the windows of car 15.

Nozzles 420, 425, 430, 435, nozzles 440, 445, 450, 455 and nozzles 460, 465, 470 and 475 are referred to as the high pressure nozzles. One nozzle that is found to be effective for high pressure nozzles 420–475 is the Turbo Nozzle, Model 22030, available from Giant Industries, Inc. Toledo, Ohio. These nozzles advantageously produce a rotating or undulating high pressure spray having zero nozzle with a 30% circular spread.

To provide body soap to the body of car 15, the output of valve 210 is coupled to low pressure nozzles 480 which are distributed substantially uniformly along fluid delivery portions 305, 310 and 315 of movable fluid delivery assembly 300 as shown.

To provide soft water and spot free water to the body of car 15, the output of city water valve 215 and spot free water valve 220 are coupled to a common soft/spot free water supply line 485. Soft/spot free water supply line 485 is coupled to low pressure nozzles 490 which are distributed substantially uniformly along fluid delivery portions 305, 310 and 315 of movable fluid delivery assembly 300 as shown. One nozzle that is found to be effective for high pressure nozzles 480 and 490 is the Model 22030 Turbo Nozzle available from Giant Industries, Inc., Toledo, Ohio.

To provide tire soap to the tires of car 15, the output of tire soap valve 205 is coupled to four nozzles 495 which are respectively located at tire cleaning stations 375, 380, 375' and 380'. To provide high pressure water to the tires of car 15, high pressure valve output 200B is coupled to the same four nozzles 495 which are located at tire cleaning stations 375, 380, 375' and 380'.

To distribute high pressure water to the grill or front of car 15, high pressure valve output 400B is coupled to nozzles 500. In this particular embodiment, four nozzles 500 are substantially uniformly distributed along nozzle support member 505. Nozzle support member 505 is mounted adjacent rear wall 20C of enclosure 20 so that the high pressure water from nozzles 500 is sprayed onto the front of car 15.

Valves 200, 400, 405, 410 and 415 are coupled to computer 225 such that computer 225 can direct these valves when to turn on and off to provide high pressure water to fluid delivery assembly 300. In this manner, high pressure water is sprayed onto car 15 as fluid delivery assembly moves back and forth along track 330 under the driving action of drive motor 325.

Valves 205 and 210 are coupled to computer 225 so that computer 225 can control the times when valves 205 and 210 are turned on and off to provide tire soap and body soap, respectively, to fluid delivery assembly 300. Tire soap and body soap are thus supplied under low pressure to car 15.

Valves 215 and 220 are coupled to computer 225 to enable computer 225 to control the times when valves 215 and 220 are turned on and off to provide soft water and spot free water, respectively, to fluid delivery assembly 300. Soft water and spot free water are thus supplied under low pressure to car 15. Valve 200 is coupled to computer 225 so that computer 225 can control the times when high pressure water is supplied to tire cleaning stations 375, 375', 380 and 380, or alternatively to valves 405, 410 and 415 for distribution to the nozzles on movable fluid delivery assembly 30.

A drain 510 is provided in floor 365 to permit drainage of the fluids that are applied to car 15 in the process of cleaning the car. An exhaust fan 515 is provided in ceiling 22 to exhaust the air within enclosure 20 when the car is being dried. Computer 225 is coupled to exhaust fan 515 to control the times at which exhaust fan 515 is turned on and off. A retractable covering 520 is positioned adjacent the opening 525 in enclosure 20 through which car 15 enters and exits enclosure 20. Covering 520 covers opening 525 to partially seal the interior of enclosure 20 from the outside environment. Covering 520 is manually controlled, or alternatively, is coupled to computer 225 which sends the appropriate control signal to covering mechanism 520 to close the covering prior to commencement of the cleaning process.

In one embodiment of the cleaning method of the present invention, three wash cycles and one drying cycle are employed in the course of cleaning car 15. A greater or lesser number of wash cycles may also be employed depending on the level of cleanliness desired. It has been found, however, that for most circumstances three wash cycles are sufficient. Computer 225, under direction of the control program therein, sets the on and off times of the valves in car wash 10 to control the time durations of the steps in the cleaning method set forth in the example in the tables below.

TABLE 1

FIRST WASH CYCLE

| STEP | DURATION (SEC) | VALVES OPEN |
|---|---|---|
| Start Fluid Delivery Assembly In Motion | 30 (delay) | none |
| Soft Water Rinse (Temperature Normalization & Stabilization - Soft City Water) | 60 | 220 |
| Soap Tires (Low Pressure) | 18 | 205 |
| Soap Car Body (Low Pressure) | 60 | 210 |
| Soaking Time (Delay) | 60 | none |
| Hi Pressure Water - Tires (Clean & Rinse) | 60 | 200B |
| Hi Pressure Water - Grill (Clean & Rinse) | 60 | 200A, 400B |
| Hi Pressure Water - Rocker Panels (Clean & Rinse) | 60 | 200A, 400A, 405A, 405C |
| Hi Pressure Water - Windows (Clean & Rinse) | 60 | 200A, 400A, 405B, 410A, 415A, 415 B |
| Hi Pressure Water - Top (Clean & Rinse) | 60 | 200A, 400A, 405B, 410 |

After the first wash cycle of Table 1 is completed under direction of computer 225, computer 225 carries out the second wash cycle of Table 2 below:

TABLE 2

SECOND WASH CYCLE

| STEP | DURATION (SEC) | VALVES OPEN |
|---|---|---|
| Soap Tires (Low Pressure) | 18 | 205 |
| Soap Car Body (Low Pressure) | 60 | 210 |
| Soaking Time (Delay) | 60 | none |
| Hi Pressure Water - Tires (Clean & Rinse) | 60 | 200B |
| Hi Pressure Water - Grill (Clean & Rinse) | 60 | 200A, 400B |
| Hi Pressure Water - Rocker Panels (Clean & Rinse) | 60 | 200A, 400A, 405A, 405C |
| Hi Pressure Water - Windows (Clean & Rinse) | 60 | 200A, 400A, 405B, 410A, 415A, 415B |
| Hi Pressure Water - Top (Clean & Rinse) | 60 | 200A, 400A, 405B, 410B |

After the second wash cycle of Table 2 is completed under direction of computer 225, computer 225 carries out the third wash cycle of Table 3 below:

TABLE 3

| STEP | DURATION (SEC) | VALVES OPEN |
|---|---|---|
| THIRD WASH CYCLE | | |
| Soap Tires (Low Pressure) | 18 | 205 |
| Soap Car Body (Low Pressure) | 60 | 210 |
| Soaking Time (Delay) | 60 | none |
| Hi Pressure Water - Tires (Clean & Rinse) | 60 | 200B |
| Hi Pressure Water - Grill (Clean & Rinse) | 60 | 200A, 400B |

TABLE 3-continued

| STEP | DURATION (SEC) | VALVES OPEN |
|---|---|---|
| Hi Pressure Water - Rocker Panels (Clean & Rinse) | 60 | 200A, 400A, 405A, 405C |
| Hi Pressure Water - Windows (Clean & Rinse) | 60 | 200A, 400A, 405B, 410A, 415A, 415B |
| Hi Pressure Water - Top (Clean & Rinse) | 60 | 200A, 400A, 405B, 410B |
| DRYING CYCLE | | |
| Run-Off and Drying | 180 | none |
| Spot Free Rinse - Full Car | 90 | 215 |
| Exhaust Fan On and Drive Motor Off | 1800 | none |

To carry out the wash and dry cycles set forth above, computer 225 issues the appropriate control signals to open the particular valves that are specified in the tables on a step by step basis. For a particular step in the process, it is assumed that all valves in the system other than those listed for the step are closed. As mentioned earlier, a very simple computer such as an irrigation controller can be used for computer 225. The main requirement for computer 225 is that it be able to turn on the specified valves (and turn off the other valves) in the sequence specified above and for the time durations specified above. Computer 225 must also be able to turn on and off drive motor 325 and exhaust motor 515 at the specified times and for the specified durations.

It should be understood that the above steps between the first and last steps listed are carried out while movable fluid delivery assembly 300 is moving back and forth along track 330. This back and forth motion of fluid delivery assembly 300 occurs while assembly 300 continues to dispense the various fluids specified according to the particular step that is presently being implemented. In one embodiment of the invention, fluid delivery assembly 300 moves along track 330 at the rate of approximately 12 inches/sec.

The above process tables make it clear that in one embodiment of the invention, car wash 10 washes car 15 section by section. In this manner, system pressure is maintained. Otherwise, should too many valves be turned on simultaneously, pressure at the nozzles could be undesirably lowered.

FIG. 3 show a cross section of car wash 10 of FIG. 1 taken along section line 3—3. This view more clearly shows the hose assembly 600 which includes flexible hoses to connect movable fluid dispensing assembly 300 to the remainder of the system.

The drive motor 325, pumps 100, 125, 145 and other electrical equipment within car wash 10 are conveniently 220 volt, single phase devices in one particular embodiment of the invention. The walls of enclosure 20 are sealed with Damtite Waterproofer sealant (Thomas Waterproof Coatings Co., Atlanta, Ga. 30303) to prevent penetration of water during the washing process. It has been found that the disclosed car wash can effectively wash a car with relatively low amounts of water for example, less than 100 gallons of water, and even with as little as 65 gallons of water.

It has been found that there is an optimal surface temperature range for washing a car when using the disclosed apparatus. For example, if the surface of the car is too hot when soap is applied to the car, then the soap will scald and dry in position when it is applied to the car. Undesired spots tend to result from such scalding. If the car is too cold, the cleaning effect of the soap is decreased. To circumvent these problems, it is desirable that before soap is applied to the car the temperature of the car surface should be within the range of approximately 60 degrees F. to approximately 80 degrees F. Thus, if the car exhibits a surface temperature below this range it should be brought up to this range, and if the surface temperature is above this range it should be brought down to this range. In other words, the car temperature should be normalized prior to application of soap for best results. This step is referred to as temperature normalization or temperature stabilization. To accomplish this temperature normalization or stabilization, the first wash cycle of Table 1 includes the step of applying a "Soft Water Rinse" exhibiting a temperature within the range of 80 degrees F. to 45 degrees F. (ambient city water temperature) to the car prior to the step of soaping the tires.

While the above description sets forth a personal automatic car wash apparatus, it is clear that a method of operating the car wash is also disclosed. More particularly, a method of washing a stationary car is disclosed which includes the steps of softening untreated water to provide soft water and heating the soft water to provide hot soft water. The method also includes the step of pressurizing and mixing the hot soft water with soap to provide a low pressure heated soap/water mix. The method further includes the step of pressurizing the hot soft water to provide high pressure heated rinse water. The method also includes generating spot free water from the soft water provided by the softening step. The method still further includes the steps of spraying the car with the low pressure heated soap/water mix and spraying the car with the high pressure heated rinse water. One embodiment of the method includes the additional steps of providing a movable nozzle assembly through which the spraying steps are carried out, and moving the nozzle assembly back and forth longitudinally about the car to wash and rinse the car in a steam-bath-like environment.

The foregoing has described a personal automatic car wash for use on cars or other vehicles. The car wash desirably is capable of washing the user's car overnight without user intervention The car wash provides extended periods of washing and rinsing at temperatures above normal ambient temperatures. A steam-bath like atmosphere is provided and breaks the oil film that is picked up from driving which enhances the removal of dirt and oil film from the car. A spot free water final rinse promotes clear drying of the washed car.

To reiterate, in the first stage a movable fluid applicator applies the complete car with soft city water to obtain temperature normalization or stabilization so as not to damage the car's paint because of extreme outside temperature variations. In the second stage, the movable fluid applicator applies the tires with soap. In the third stage the movable fluid applicator applies the compete car with soap. Then there is a short period of time in which the car is allowed to soak. In the next stage the car is cleaned and rinsed in sections by the movable fluid applicator which has a set of high pressure water nozzles. The tires are high pressured cleaned and rinsed. Then the grill is high pressured cleaned and rinsed. The rocket panels are high pressured cleaned and rinsed. Then the windows are high pressured cleaned and rinsed. Then the top side of the car is high pressured cleaned and rinsed. Then the above complete cycle is repeated a second time. Then the above cycle is repeated a third time. In the next stage, the car is allowed to dry for a short period of time. The next stage the movable fluid applicator applies the complete car with spot free rinse to give a spot free car. In the final stage an exhaust fan is turned on to help exhaust steam and vapor allowing the car to dry. The reason that the car is washed in stages, sections and cycles is to allow for the use of normal residential electric (110 & 220) and normal residential city water from ¾ to 1 inch line water lines that are used in most home.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A car wash comprising:
an enclosure for receiving a car which is to be washed, the enclosure including an opening through which the car can enter and exit;
an input for untreated water;
a water softener, coupled to the input, for providing soft water;
a hot water heater, coupled to the water softener, for providing hot soft water;
a pressurized soap source, coupled to the hot water heater, for mixing the hot soft water with soap to provide a low pressure heated soap/water mix;
a pressurized rinse water source, coupled to the hot water heater, for pressurizing the hot water to provide high pressure heated rinse water;
a spot free water generator, coupled to the water softener, for providing hot spot free water;
a movable fluid application apparatus, situated in the enclosure, including first nozzles for applying soft city water to obtain temperature normalization or stabilization, and including second nozzles for applying the low pressure heated soap/water mix to the car, and including third nozzles for applying the high pressure heated cleaning and rinse water to the car, providing a steambath-like atmosphere for cleaning the car, and including fourth nozzles for applying the spot free water to the car; and
to distribute fluid to the car to clean the car.

2. A car wash for washing a car which includes side surfaces, front and rear surfaces, and a top surface, the car wash comprising:
an enclosure including a back and a front, the front having an opening through which a car can enter and exit, the enclosure further including opposed side surfaces, a floor and a ceiling;
water softening means for softening untreated water to provide soft water;
heating means, coupled to the water softening means, for heating the soft water to provide hot soft water;
pressurizing and mixing means, coupled to the heating means, for pressurizing and mixing the hot soft water with soap to provide a low pressure heated soap/water mix;
hot water pressurizing means, coupled to the heating means, for pressurizing the hot soft water to provide high pressure heated rinse water;
spot free water generating means, coupled to the water softener, for generating spot free water from the soft water;

first spraying means, situated in the enclosure and coupled to the pressurizing and mixing means, for spraying the car with the low pressure heated soap/water mix;

second spraying means, situated in the enclosure and coupled to the hot water pressurizing means, for spraying the car with high pressure heated rinse water to rinse the car; and third spraying means, situated in the enclosure and coupled to the spot free water generating means, for spraying the car with spot free water.

3. The car wash of claim 2 further comprising a movable fluid dispensing assembly on which the first, second and third spraying means are situated to provide a steambath-like environment to a car within the enclosure.

4. The car wash of claim 3 wherein the movable fluid dispensing assembly exhibits an inverted U-like shape in the form of an arch.

5. The car wash of claim 3 further comprising a track mounted adjacent the ceiling of the enclosure and running in a direction from the back to front of the enclosure for supporting the movable fluid dispensing assembly above and around the sides of the car when a car is present in the enclosure.

6. The car wash of claim 5 further comprising a drive motor for repeatedly driving the movable fluid dispensing assembly back and forth about the car to wash and rinse the car.

7. The car wash of claim 6 further comprising a control computer coupled to the first, second and third spraying means for instructing the first, second and third spraying means when to spray the car while the movable fluid dispensing means is driven back and forth about the car.

8. The car wash of claim 7 wherein the control computer implements a wash cycle and includes first activating means for activating the first spraying means to spray the car with the low pressure heated soap/water mix for a first predetermined time period, and second activating means for activating the second spraying means to spray the car with hot soft water to rinse the car for a second predetermined time period, the first and second time period being included in the wash cycle.

9. The car wash of claim 8 wherein the control computer includes repeating means for repeating the wash cycle.

10. The car wash of claim 9 wherein the control computer includes third activating means for activating the third spraying means to spray the car with spot free soft water after the wash cycle.

11. The car wash of claim 2 wherein the spot free water generating means comprises a reverse osmosis system which removes impurities from the water supplied thereto.

12. The car wash of claim 2 further comprising an alignment bumper situated on the floor of the car wash for aligning a car within the enclosure.

13. The car wash of claim 2 further comprising an exhaust fan situated in the enclosure for exhausting the atmosphere within the enclosure to outside the enclosure to help force drying of the car.

* * * * *